United States Patent Office 3,450,148
Patented June 17, 1969

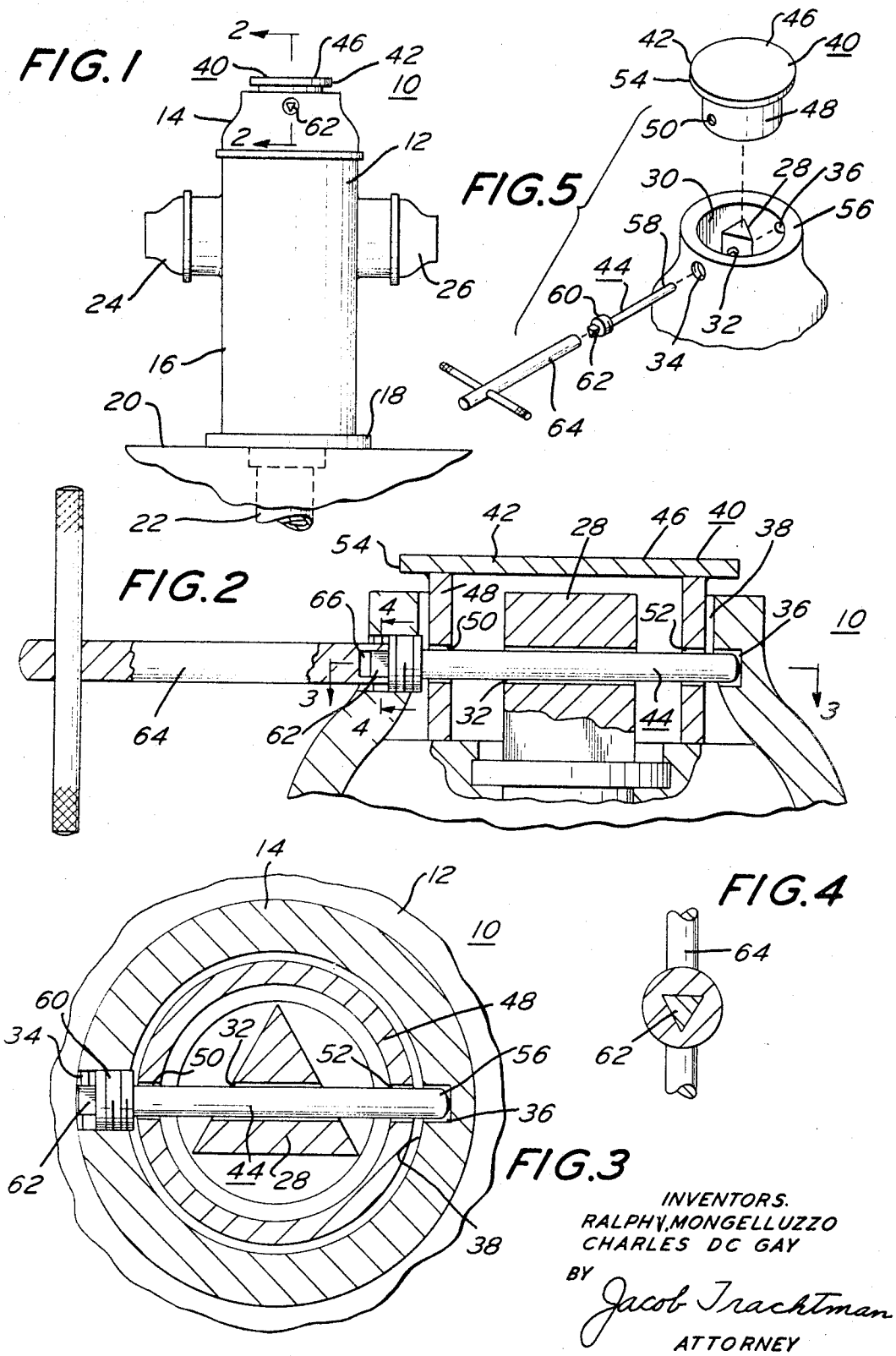

3,450,148
VALVE LOCKING MEANS
Ralph Vincent Mongelluzzo, 2234 S. Shields St. 19142, and Charles DC Gay, 5610 Catherine St. 19143, both of Philadelphia, Pa.
Filed Aug. 31, 1966, Ser. No. 576,280
Int. Cl. E03b 9/02
U.S. Cl. 137—296          10 Claims

ABSTRACT OF THE DISCLOSURE

A hydrant with valve locking means comprising a housing providing a stem opening and a bolt opening, an operating stem having an end portion positioned within said stem opening of said housing for rotary actuating between open and closed positions, said stem having an opening therethrough which is alignable with the bolt opening of said housing when said stem is in its closed position, a cap means removably received within the stem opening of said housing enclosing the said stem, and having an opening alignable with said bolt opening of said housing and said opening of said stem, and lock bolt means removably received through said bolt opening in said housing, the aligned openings of said cap means and said stem for securing said cap means in position enclosing said stem end portion and preventing movement of said stem.

---

The invention relates to a valve locking means for a hydrant, and more particularly to a valve locking means which minimizes unauthorized actuation or tampering with the hydrant.

Although locking means for valves have heretofore been provided, the present valve locking means for hydrants provides a simple means for completely enclosing and removing access of the actuating stem to unauthorized personnel. The valve locking means is also adaptable for installation on presently existing hydrants without requiring major change and alteration of same.

It is therefore a principal object of the invention to provide a new and improved valve locking means for a hydrant which removes access to unauthorized persons of the actuating stem of the hydrant, while allowing authorized personnel to readily operate the hydrant by use of a special key means.

Another object of the invention is to provide a new and improved valve locking means which is simple in construction and operation, and is readily adaptable to use with hydrants of conventional type which are already in place and in use by requiring only minor changes therein.

The above objects as well as many other objects of the invention are achieved by providing a valve locking means for a hydrant comprising a cap means for being removably received within the stem opening of a hydrant housing for enclosing the hydrant operating stem, and a lock bolt means for being removably received through a bolt opening in the housing of said hydrant for extending through aligned openings in said cap means and the hydrant stem while enclosed by said cap means for securing said cap means in position enclosing said stem and preventing movement of said stem. The bolt at one end is provided with a threaded portion for threadedly engaging said opening of the housing of the hydrant and an extending key element for engagement by a key means for actuating said bolt means into and out of engagement with the housing of the hydrant, the hydrant stem and said cover means.

The foregoing and other objects of the invention will become more apparent when the following detailed description of the invention is read in conjunction with the drawings, in which:

FIGURE 1 is a side elevational view of a hydrant with a valve locking means embodying the invention, FIGURE 2 is a fragmentary sectional view taken on the line 2—2 of FIGURE 1 in enlarged form, FIGURE 3 is a sectional view taken on the line 3—3 of FIGURE 2, FIGURE 4 is a sectional view taken on the line 4—4 of FIGURE 2, and FIGURE 5 is an exploded perspective view of the top portion of the hydrant shown in FIGURE 1 illustrating the valve locking means thereof.

Like numerals designate like parts throughout the several views.

Referring to the figures, a hydrant 10 which embodies the invention, comprises a housing 12 having a top portion 14 and a bottom cylindrical portion 16 with a base 18 for being supported upon a horizontal surface 20. The hydrant 10 may be attached to a source of water by a pipe 22. The cylindrical portion 16 of the housing 12 may be provided with a pair of water outlet nozzles 24 and 26, while housing therein a valve means for controlling the flow of water from the connecting pipe 22 to the outlet nozzle 24, 26. The valve means which is not shown may be of conventional form, having a projecting actuating stem 28 which is located within the opening 30 of the top portion 14 of the housing 12. The rotation of the stem 28 in one direction about its vertical axis acts to shut off and prevent the flow of water from the source to the outlet nozzles 24, 26, upon reaching its terminal position as shown in FIGURE 5, while the rotation of the stem 28 in the other direction actuates the hydrant valve into its open position allowing the flow of water therethrough.

The stem 28 is provided with an opening 32 therethrough, while the top portion 14 of the hydrant housing 12 is provided with a threaded opening 34 on one side and a depressed region or receptacle 36 on the inside wall 38 opposite the opening 34.

The valve locking means 40 comprises a cap means 42 and a lock bolt means 44. The cap means 42 has a plane top plate 46 and a cylindrical skirt portion 48 extending downwardly therefrom. The skirt portion 48 of the cap means 42 is provided with a pair of diametrically opposite openings 50, 52 (see FIGURE 2).

In operation, when the hydrant 10 is to be locked with its valve in the closed position preventing flow of water therethrough, the stem 28 is rotated until it is in its terminal position actuating the valve to its closed condition. When the valve 28 is in this position, its opening 32 is in alignment with the opening 34 and the receptacle 36 of the top portion 14 of the hydrant housing 12. Of course, the stem 28 may be rotated by a suitable wrench of conventional form provided for this purpose. The cap means 42 of the valve locking means 40 is then positioned over the stem 28 so that the skirt portion 48 extends into the opening 30 in the top portion 14 of the housing 12 and surrounds the stem 28, while the plate 46 covers the opening 30 of the housing 14 and has a ledge 54 which extends over the top surface 56 of the housing 12. The cap means 40 may be rotated at this time, so that its opposite openings 50, 52 are in alignment with the bolt opening 34 and receptacle 36 of the top portion 14 of the housing 12, as well as being in alignment with the opening 32 through the stem 28.

With the openings thus aligned, the end 58 of the lock bolt means 44 may be sequentially received thru the opening 34 of the top portion 14 of the housing 12, the opening 50 of the cap means 40, the opening 32 of the stem 28, the opening 52 of the cap means 40, at which time the threaded enlarged end 60 contacts the threaded opening 34. The lock bolt means 44 may now be rotated for threadedly engaging at its end 60 the opening 34 of the housing 12, thereby advancing the bolt means 40 more towards its terminal locked position wherein its end 58 is received into and engages the depression or receptacle 36 on the inside wall 38 of the housing 12. In order to rotate the bolt means 44, an extending key element 62 is provided thereon having a predetermined cross section such as the triangular form illustrated, for engagement by a key means 64 providing a complementary receptacle 66 therefor. When the bolt means 44 is in its terminal position as illustrated in FIGURE 2, after actuation by the key means 64, its key element 62 is received within the opening 34 of the housing 12 in recessed position thereby making it extremely difficult for the bolt means to be removed without the use of the key means 64.

With the bolt means 44 in place as shown in FIGURES 2 and 3, it extends through the opening 32 of the actuating stem 28 which is in its terminal position retaining the hydrant valve in its closed condition preventing flow of water therethrough. In addition, the cap means 42 is retained in position by the bolt means 44 covering and surrounding the stem 28, thereby removing access thereto and further protecting the stem 28 from external actuation.

When the stem 28 is to be actuated by authorized personnel, the key means 64 is positioned with its opening 66 engaging the key element 62 of the bolt means 44 for rotating same and thereby removing the bolt means 44. The removal of the bolt means 44 frees the cap means 42 and at the same time disengages the stem 28 so that same can be actuated upon removal of the cap means 42. Of course, if the hydrant is to be locked with its valve means open so that water may flow through the hydrant for discharge through its outlets 24, 26, the stem 28 may be turned in the direction to open the hydrant valve and positioned with its opening 32 in alignment for receiving the bolt means 44 therethrough as described above. The hydrant can then have its valve locked in such an opened position.

The hydrant 10 has many advantages in the simple construction of its valve locking means as well as the ease in manner in which it may be locked and unlocked by authorized personnel while minimizing tampering and actuation by unauthorized persons. The valve locking means may also readily be applied to conventional hydrants with very little modifications to such hydrants for this purpose. For example, the opening 34 in the housing 12, the opening 32 through the stem, and the depressed receptacle 36 need be the only modifications or changes in a standard hydrant to adapt same to receive the cap means 42 and bolt means 44 to provide the advantages of the invention.

It will be obvious to those skilled in the art that the invention may find wide application with appropriate modifications to meet the individual design circumstances, but without substantial departure from the essence of the invention.

What is claimed is:

1. In a hydrant having a housing with an opening for an operating stem and a locking bolt opening, the combination of a cap means for being removably received within the stem opening of a hydrant for enclosing said stem opening and having an opening therethrough, an operating stem for being positioned within the stem opening of said hydrant and having an end portion enclosed by said cap means and having an opening therethrough, and a lock bolt means for being removably received through said bolt opening in the housing of said hydrant and extending through the aligned openings in said cap means and said stem when enclosed by said cap means for securing said cap means in position enclosing said stem end portion and preventing movement of said stem.

2. The means of claim 1 in which said bolt means at one end is provided with a threaded portion for threadedly engaging said opening in the housing of said hydrant and an extending key element for engagement by a key means for actuating said bolt means into and out of engagement with the housing of said hydrant, the hydrant stem and said cap means.

3. The means of claim 2 in which said cap means comprises a top plate for covering the stem opening of the hydrant housing and a cylindrical skirt portion extending from said top plate for being received into the stem opening of said housing about said stem for enclosing and making externally inaccessible said stem end portion when said cap means is in position within said stem opening, the skirt portion of said cap means being provided in diametrically opposite sides thereof with aligned openings alignable with the bolt opening of said housing for receiving said bolt means therethrough, when said bolt receiving opening in said stem is also aligned with the bolt opening in said housing.

4. The means of claim 3 in which the key element of said bolt means has a polygonal cross-section for engagement by a key means having a complementary means for engaging and rotating same, while the opposite end of said bolt means extends for engaging said housing at a receptacle in said housing opposite said bolt opening of said housing for positively locking said bolt means with said housing when in its fully engaged position, securing said cap means with said housing enclosing said stem end portion and locking said stem against rotation when so engaged by said bolt means, thereby minimizing tampering and unauthorized actuation of the stem of said hydrant.

5. The means of claim 4 in which the key element of said bolt means is in a recessed position within the bolt opening of said housing when said bolt means is in its fully engaged position, and a key means having an end for being received into the bolt opening of said housing for engaging the key element and rotating said bolt means for removal or engagement of said bolt means with said housing.

6. A hydrant with valve locking means comprising a housing providing a stem opening and a bolt opening, an operating stem having an end portion positioned within said stem opening of said housing for rotary actuation between open and closed positions, said stem having an opening therethrough which is alignable with the bolt opening of said housing when said stem is in its closed position, a cap means removably received within the stem opening of said housing enclosing the said stem end portion, and having an opening alignable with said bolt opening of said housing and said opening of said stem, and lock bolt means removably received through said bolt opening in said housing, the aligned openings of said cap means and said stem for securing said cap means in position enclosing said stem end portion and preventing the movement of said stem.

7. The means of claim 6 in which said bolt means at one end is provided with threaded portion for threadedly engaging said opening in the housing of said hydrant and an extending key element for engagement by a key means for actuating said bolt means into and out of engagement with the housing of said hydrant, the hydrant stem and said cap means.

8. The means of claim 7 in which said cap means comprises a top plate for covering the stem opening of the hydrant housing and a cylindrical skirt portion extending from said top plate for being received into the stem opening of said housing about said stem for enclosing and making externally inaccessible said stem end portion when said cap means is in position within said stem opening, the skirt portion of said cap means being provided in diametrically opposite sides thereof with aligned openings alignable with the bolt opening of said housing for receiving said bolt means therethrough, when said bolt receiving opening in said stem is also aligned with the bolt opening in said housing.

9. The means of claim 8 in which the key element of said bolt means has a polygonal cross-section for engagement by a key means having a complementary means for engaging and rotating same, while the opposite end of said bolt means extends for engaging said housing at a receptacle in said housing opposite said bolt opening of said housing for positively locking said bolt means with said housing when in its fully engaged position, securing said cap means with said housing enclosing said stem end portion and locking said stem against rotation when so engaged by said bolt means, thereby minimizing tampering and unauthorized actuation of the stem of said hydrant.

10. The means of claim 9 in which the key element of said bolt means is in a recessed position within the bolt opening of said housing when said bolt means is in its fully engaged position, and a key means having an end for being received into the bolt opening of said housing for engaging the key element and rotating said bolt means for removal or engagement of said bolt means with said housing.

References Cited

UNITED STATES PATENTS

| | | | |
|---|---|---|---|
| 1,003,211 | 9/1911 | Shepard | 137—382 XR |
| 1,248,172 | 11/1917 | Schuhmann | 137—383 XR |

FOREIGN PATENTS 714,177　11/1941　Germany.

CLARENCE R. GORDON, *Primary Examiner.*

RICHARD GERARD, *Assistant Examiner.*

U.S. Cl. X.R.

137—382; 220—55